Patented Mar. 18, 1941

2,235,783

UNITED STATES PATENT OFFICE 2,235,783

ETHERS OF GLUCOSIDES

Elwood V. White, Moscow, Idaho, assignor to The Dow Chemical Company, Midland, Mich., a corporation of Michigan No Drawing. Application September 13, 1939, Serial No. 294,679

10 Claims. (Cl. 260—210)

This invention relates to the preparation of new and useful glucose derivatives.

It is an object of this invention to obtain glucose derivatives from ethylated complex polysaccharides.

A further object is the preparation of glycosides of glucose ethers having substituent groups in two or more of the 2, 3 and 6 positions of the glucose residue and the separation of the di-substituted glycoside ethers from the tri-substituted derivatives.

Another object is the preparation of ethyl glucosides of 2.3.6-tri-substituted glucose ethers and of mixtures of ethyl glucosides of 2.3-, 2.6-, and 3.6-di-substituted glucose ethers substantially uncontaminated by other materials.

Yet further objects will become apparent in the following description.

I attain these objects by carrying out a process of alcoholysis on a highly ethylated complex polysaccharide and obtaining the desired substances from the mixed glucosidic products. The process of alcoholysis, especially when commercial polysaccharide ethers such as ethyl cellulose are used, will normally give a mixture of products. Etherification of the polysaccharide is usually not uniform. Thus, a highly etherified ethyl cellulose, other than a completely etherified product, will yield on alcoholysis chiefly a triethyl glucoside. It will yield, in addition, quantities of both di- and mono-ethyl glucosides besides unethylated glucoside and tars which almost invariably result from prolonged heating of carbohydrate derivatives with acids. The problem of isolating the di- and tri-ethyl glucosides from the reaction mixture and their separation from each other is difficult. Fractional distillation is complicated by the number of the constituents and their chemical and physical similarity. Further, the presence of tars causes an accelerated rate of decomposition on heating. It is desirable, therefore, to effect a separation which avoids direct fractional distillation and its concomitant heating.

According to the new process, the product of alcoholysis (carried out by heating a complex polysaccharide ethyl ether with 3 to 6 times its weight of a lower alcohol containing 2 to 4 carbon atoms in the presence of a catalytic quantity of a mineral acid in the manner described in my co-pending application Serial No. 294,678, filed concurrently herewith) is extracted with a lower petroleum fraction. I have found that the alkyl di- and tri-ethyl glucosides, where alkyl is a radical containing 2 to 4 carbon atoms, are soluble in lower aliphatic hydrocarbon solvents while the corresponding mono-ethyl derivatives, the unethylated derivatives and the main part of the reaction tars are insoluble in these solvents. This discovery is surprising in view of the fact that methyl 2.3.6-tri-methyl glucoside and methyl dimethyl glucosides having long been known to be insoluble in aliphatic hydrocarbons. Following this partition by extraction, the di- and tri-ethyl glucosides may be separated by fractional distillation or by converting them into the corresponding di- and tri-ethyl glucoses, separating the latter by crystallization and reconverting the separated components into glucosides, wherein the glucosidic group may consist of one of the following radicals:—alkyl radicals having 3 to 20 carbon atoms, and hydroxy-alkyl, alkoxy-alkyl radicals derived from the corresponding alcohols. Other glucosides, preparable from other alcohols of partially aromatic character, are described in a co-filed application, Serial No. 294,680.

The new method of separation makes possible the isolation of the di- and tri-ethyl glucosides, which, on account of their good solubility properties, compatibility and low volatility are valuable, permanent constituents of cellulose ether compositions. They are also particularly valuable intermediates in the preparation of technically important sorbitol ethers. The method is limited to the separation of the products of alcoholysis when the reacting alcohol is ethyl alcohol, primary or secondary propyl alcohol, or primary or secondary butyl alcohols. The products of the separation may be listed as follows: ethyl di- and tri-ethyl glucosides, n-propyl di- and tri-ethyl glucosides, sec.-propyl di- and tri-ethyl glucosides, n-butyl di- and tri-ethyl glucosides, isobutyl di- and tri-ethyl glucosides, and sec.-butyl di- and tri-ethyl glucosides.

In addition, the invention has a valuable application in the preparation of 2.3.6-triethyl glucose and of mixed diethyl glucoses from which a wide variety of useful glucosides may be made. To this end, the isolated tri- and di-ethyl glucoses are heated with a primary or secondary alcohol type compound of aliphatic character in the presence of a mineral acid. A wide variety of such alcohol type compounds are available, namely, alkanols containing 3 to 20 carbon atoms, hydroxy-alkanols, and alkoxy-alkanols. Examples of compounds of these types are butyl alcohol, glycerine, and ethoxy ethyl alcohol. This list may be extended indefinitely.

The invention has particular utility in the separation of lower alkyl di- and tri-ethyl glucosides from products of alcoholysis of commercial ethyl cellulose, since technical ethyl cellulose of sufficiently high ethoxy content to yield high proportions of di- and tri-ethyl glucosides is readily available. The new ethyl ethers of glucosides have the general formula

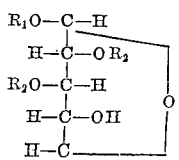

barium carbonate and the precipitated barium sulphate removed by filtration. The filtrate is evaporated under reduced pressure to crystallization. Upon formation of crystals, the flask is removed from its bath, heated to dissolve the crystals already formed and allowed to cool. The crystalline product is removed from its mother liquor, pressed dry and recrystallized from distilled water. The mother liquor and washings are then further evaporated and set aside to crystallize. Repetition of this process frees the liquor of most of the tri-derivative which upon recrystallization from water is obtained pure. Melting point 94°–95° C. and the

EXAMPLE 5

*Preparation of beta-ethoxy ethyl 2.3.6-triethyl glucoside*

This preparation is carried out as in Example 3, lauryl alcohol being replaced by an identical volume of cellosolve (monoethyl ether of ethylene glycol). The product is a colorless, mobile liquid boiling at 160° C. under 2 mm. pressure and of refractive index 1.4505 at 25° C.

The new compounds are useful as intermediates in the preparation of novel sorbitol ethers and as plasticizers, softening agents, and the like, particularly in cellulose ether compositions.

I claim:

1. In a method of preparing a lower alkyl 2.3.6-triethyl glucoside and of mixed lower alkyl 2.3-, 2.6- and 3.6-diethyl glucosides from an ethylated complex polysaccharide, the step of separating a mixture of lower alkyl 2.3.6-triethyl glucoside and lower alkyl 2.3-, 2.6- and 3.6-diethyl glucosides from lower alkyl mono-ethyl glucosides, lower alkyl unethylated glucoside and reaction tars by extraction with petroleum ether, the lower alkyl group in each instance derived from a primary or secondary alcohol containing 2 to 4 carbon atoms inclusive.

2. In a method of preparing a lower alkyl 2.3.6-triethyl glucoside and of mixed lower alkyl 2.3-, 2.6- and 3.6-diethyl glucosides from ethyl cellulose, the step of separating a mixture of lower alkyl 2.3.6-triethyl glucoside and lower alkyl 2.3-, 2.6- and 3.6-diethyl glucosides from lower alkyl mono-ethyl glucosides, lower alkyl unethylated glucoside and reaction tars by extraction with petroleum ether, the lower alkyl group in each instance derived from a primary or secondary alcohol containing 2 to 4 carbon atoms inclusive.

3. In a method of preparing a lower alkyl 2.3.6-triethyl glucoside and of mixed lower alkyl 2.3-, 2.6- and 3.6-diethyl glucosides from ethyl starch, the step of separating a mixture of lower alkyl 2.3.6-triethyl glucoside and lower alkyl 2.3-, 2.6- and 3.6-diethyl glucosides from lower alkyl mono-ethyl glucosides, lower alkyl unethylated glucose and reaction tars by extraction with petroleum ether, the lower alkyl group in each instance derived from a primary or secondary alcohol containing 2 to 4 carbon atoms inclusive.

4. A method of separating lower alkyl 2.3.6-triethyl glucosides and mixed lower alkyl 2.3-, 2.6- and 3.6-diethyl glucosides from the product of alcoholysis of an ethylated complex polysaccharide using a primary or secondary alcohol of 2 to 4 carbon atoms, which comprises extracting the alcoholic reaction product with petroleum ether and recovering said tri- and diethyl glucosidic compounds from solution in said solvent.

5. In a method of preparing a 2.3.6-triethyl glucoside and of mixed 2.3-, 2.6- and 3.6-diethyl glucosides from an ethylated polysaccharide, the steps which comprise heating the ethylated polysaccharide with 3 to 6 times its weight of a primary or secondary lower monohydric aliphatic alcohol containing 2 to 4 carbon atoms in the presence of a catalytic amount of a mineral acid, extracting the product of this alcoholysis with petroleum ether, recovering a mixture of lower alkyl 2.3.6-triethyl glucoside, and lower alkyl 2.3-, 2.6- and 3.6-diethyl glucosides by evaporation of the petroleum ether extract, hydrolyzing this mixture by heating with an aqueous solution of a mineral acid to form 2.3.6-triethyl glucose and 2.3-, 2.6- and 3.6-diethyl glucoses, separating the 2.3.6-triethyl glucose from the diethyl derivatives by crystallization followed by extraction with chloroform, and converting the so-separated glucose ethers into glucosides by heating with an alcohol type body of aliphatic nature selected from the group consisting of alkanols containing 3 to 20 carbon atoms, hydroxy-alkanols, and alkoxy-alkanols, in contact with mineral acid.

6. A new compound having the general formula

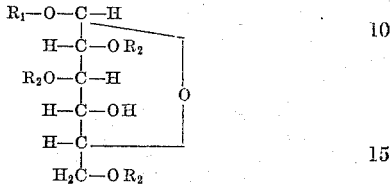

wherein $R_1$ is selected from the class consisting of alkyl groups containing from 3 to 20 carbon atoms, inclusive, hydroxy-alkyl radicals, and alkoxy-alkyl radicals, and $R_2$ is selected from the class consisting of ethyl and hydrogen, a plurality of the groups $R_2$ being ethyl.

7. A new compound having the general formula

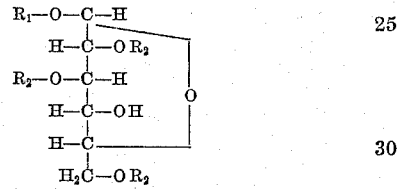

wherein $R_1$ is an alkyl radical containing 3 to 4 carbon atoms, and where at least two of the groups designated as $R_2$ are ethyl radicals, the remainder being hydrogen.

8. A new compound having the general formula

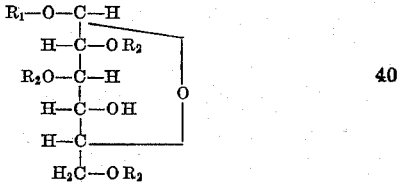

wherein $R_1$ is an alkyl radical containing from 5 to 20 carbon atoms and wherein at least two of the groups designated as $R_2$ are ethyl, the remainder being hydrogen.

9. A new compound having the general formula

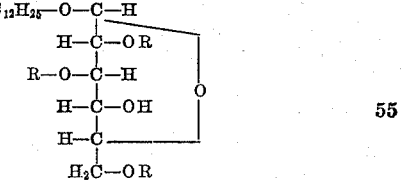

wherein the groups designated as R are selected from the class consisting of hydrogen and ethyl, a plurality of them being ethyl.

10. A new compound having the general formula

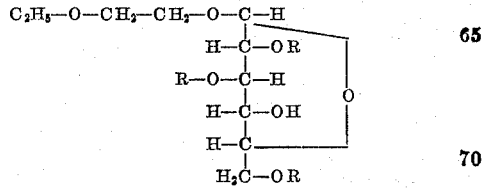

wherein the groups designated as R are selected from the class consisting of ethyl and hydrogen, a plurality of them being ethyl.

ELWOOD V. WHITE.